US009812090B2

(12) United States Patent
Lim et al.

(10) Patent No.: US 9,812,090 B2
(45) Date of Patent: Nov. 7, 2017

(54) DISPLAY DEVICE AND DRIVING METHOD THEREOF

(71) Applicant: SAMSUNG DISPLAY CO., LTD., Yongin-si, Gyeonggi-do (KR)

(72) Inventors: Woon Yong Lim, Yongin-si (KR); Ki Hyun Pyun, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 15/044,571

(22) Filed: Feb. 16, 2016

(65) Prior Publication Data

US 2016/0365071 A1 Dec. 15, 2016

(30) Foreign Application Priority Data

Jun. 10, 2015 (KR) ........................ 10-2015-0082016

(51) Int. Cl.

| | |
|---|---|
| ***G06F 3/038*** | (2013.01) |
| ***G09G 5/00*** | (2006.01) |
| ***G09G 5/18*** | (2006.01) |
| ***G09G 3/20*** | (2006.01) |

(52) U.S. Cl.

CPC ................. *G09G 5/18* (2013.01); *G09G 3/20* (2013.01); *G09G 5/008* (2013.01); *G09G 2310/0294* (2013.01); *G09G 2330/06* (2013.01)

(58) Field of Classification Search

CPC ....... G09G 2310/0294; G09G 2330/06; G09G 3/20; G09G 5/008; G09G 5/18

See application file for complete search history.

(56) References Cited

U.S. PATENT DOCUMENTS

| | | | | |
|---|---|---|---|---|
| 9,111,509 B2 | 8/2015 | Kim et al. | | |
| 2010/0148829 A1* | 6/2010 | Hong | G09G 3/3648 | 327/108 |
| 2010/0302220 A1* | 12/2010 | Baek | G09G 5/006 | 345/204 |

FOREIGN PATENT DOCUMENTS

| | | |
|---|---|---|
| KR | 20070091399 | 9/2007 |
| KR | 20110125828 | 11/2011 |
| KR | 20130009120 | 1/2013 |

* cited by examiner

*Primary Examiner* — Insa Sadio

(74) *Attorney, Agent, or Firm* — F. Chau & Associates, LLC

(57) ABSTRACT

A display device includes a display unit including a light emitting device, data and gate driver for respectively applying data and gate voltages to the display unit, and a signal controller for transmitting, to the data driver, image data having a clock embedded therein. The data driver recovers a first internal reference clock during a low period of a first frame control signal, using the image data having the clock embedded therein, compares the frequency of the recovered first internal reference clock with the frequency of a previously stored reference clock, when the frequency of the recovered first internal reference clock is within an error range of the frequency of the previously stored reference clock, outputs the recovered first internal reference clock and receives a second frame control signal, and when the second frame control signal corresponds to a CDR unit operating condition, recovers a second internal reference clock.

19 Claims, 4 Drawing Sheets

DISPLAY DEVICE AND DRIVING METHOD THEREOF

RELATED APPLICATIONS

This application claims priority to and the benefit of Korean Patent Application No. 10-2015-0082016, filed on Jun. 10, 2015, in the Korean Intellectual Property Office, the contents of which are herein incorporated by reference in their entirety.

TECHNICAL FIELD

An aspect of the present invention relates to a display device and a driving method thereof, and more particularly, to a display device and a control method thereof, which recovers an internal reference clock of the display device.

DISCUSSION OF RELATED ART

Display devices are widely used in computer monitors, televisions, cellular phones, and the like. Display devices include a liquid crystal display (LCD), a plasma display panel (PDP), an organic light emitting display (OLED), and the like. Display devices with high resolutions and larger display areas receive and process large amounts of data.

In general, when data is transmitted from a signal control IC to a data drive IC, a display device additionally requires a synchronization signal, a protocol signal, and the like, which are required to control the data drive IC.

SUMMARY

Embodiments provide a display device and a control method thereof, which can reduce an electro-magnetic interference (EMI) generated when clock data recovery (CDR) is operated to recover an internal reference clock in a data driver.

According to an exemplary embodiment, a display device displays an image using a light emitting device. A signal controller transmits an image signal and a control signal, the image signal is embedded with a clock signal. A data driver comprising a clock data recovery (CDR) unit extracts from the image signal a first internal reference clock signal during an inactive period of a first frame control signal. A memory stores the frequency of a preset reference clock signal. A comparator that compares the frequency of the recovered first internal reference clock signal with the frequency of the preset reference clock signal. When the frequency of the recovered first internal reference clock signal is within an error range of the frequency of the preset reference clock signal the comparator outputs the recovered first internal reference clock signal, and receives a second frame control signal. When the second frame control signal corresponds to a previously set CDR unit operating condition the comparator recovers a second internal reference clock signal.

In an exemplary embodiment the data driver may include a CDR unit configured to recover the first internal reference clock and the second internal reference clock. A memory stores the frequency of the preset reference clock and receives the first internal reference clock. A comparator compares the frequency of the preset reference clock with the frequency of the first internal reference clock. When the frequency of the recovered first internal reference clock is within the error range of the frequency of the preset reference clock, the comparator directs the memory to output the recovered first internal reference clock. A pulse counter receives the second frame control signal and determines whether the second frame control signal corresponds to the previously set CDR unit operating condition. When the second frame control signal corresponds to the previously set CDR unit operating condition the pulse counter transmits the second frame control signal to the CDR unit.

In an exemplary embodiment the data driver may determines which the number of a sequence the inactive period of the second frame control signal corresponds to and sets a pulse count to the determined number of times. The data driver determines whether the pulse count is identical to a previously set CDR unit operating value. When the pulse count is identical to the previously set CDR unit operating value the data driver recovers the second internal reference clock during the inactive period of the second frame control signal.

In an exemplary embodiment when the pulse count is not identical to the previously set CDR unit operating value, the data driver may omit the recovery of the second internal reference clock during the inactive period of the second frame control signal.

In an exemplary embodiment when the frequency of the recovered first internal reference clock is out of the error range of the frequency of the preset reference clock, the data driver may initialize the pulse count, and output the recovered first internal reference clock.

In an exemplary embodiment the first frame control signal may be a start frame control (SFC) signal.

In an exemplary embodiment the previously set CDR unit operating value may be $2^N$, where N is 0 or a multiple of 2.

In an exemplary embodiment when the frequency of the recovered first internal reference clock is within the error range of the frequency of the preset reference clock, the data driver may generate a control signal including information that the operation of the CDR unit is to be stopped during a predetermined period.

According to an exemplary embodiment, a method of driving a display device includes receiving a first frame control signal and recovering a first internal reference clock during a inactive period of the first frame control signal. The frequency of the recovered first internal reference clock and the frequency of a preset reference clock are compared. When the frequency of the recovered first internal reference clock is within an error range of the frequency of a preset reference clock the recovered first internal reference clock is output. When the display device receives a second frame control signal; and when the second frame control signal corresponds to a previously set CDR unit operating condition, the second internal reference clock is recovered.

According to an exemplary embodiment, a display device includes a signal controller and a data driver. The signal controller that transmits image data having an embedded clock signal. The data driver includes a clock data recovery (CDR) circuit, a memory unit and a comparator. The CDR circuit recovers from the image data a first internal reference clock signal during an off period of a first frame control signal. When a second frame control signal corresponds to a previously set clock data recovery (CDR) unit operating condition the CDR circuit recovers a second internal reference clock signal. The memory stores a frequency of a preset reference clock signal. The comparator compares the frequency of the recovered first internal reference clock signal with the frequency of a preset reference clock signal and outputs the recovered first internal reference clock signal. The comparator receives a second frame control signal when the frequency of the recovered first internal reference clock signal is within an error range of the frequency of the preset reference clock signal.

In an exemplary embodiment, a pulse counter determines which number of a sequence the inactive period of the second frame control signal corresponds to and the pulse counter is set to the determined number of times, determines whether the pulse counter is identical to a previously set CDR unit operating value, and when the pulse counter is identical to the previously set CDR unit operating value, the CDR circuit recovers the second internal reference clock during the inactive period of the second frame control signal.

In an exemplary embodiment, the previously set CDR unit operating value is $2^N$, where N is 0 or a multiple of 2.

In an exemplary embodiment, wherein the memory stores a one or more preset reference clocks. The comparator compares the frequency of the recovered first internal reference clock with the frequency of each preset reference clock.

The effects of the present invention are not limited to the effects described above, and the other effects not stated in the above will be clearly understood by those skilled in the art from the claims.

DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Hereinafter, exemplary embodiments of the invention will be described in detail with reference to the accompanying drawings.

In the following detailed description, only certain exemplary embodiments of the invention have been shown and described, simply by way of illustration. As those skilled in the art would realize, the described embodiments may be modified in various different ways, without departing from the spirit or scope of the invention. Accordingly, the drawings and description are to be regarded as illustrative in nature and not restrictive.

In the specification, when an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

It will be understood that, although the terms first, second, etc. may be used herein to describe various elements, these elements should not be limited by these terms. These terms may be used to distinguish one element from another element. For example, a first element discussed below could be termed a second element without departing from the teachings of the invention.

Also, elements of the embodiments of the invention are independently illustrated to show different characteristic functions, and it does not mean that each element is configured as separated hardware or a single software component. Namely, for the sake of explanation, respective elements are arranged to be included, and at least two of the respective elements may be incorporated into a single element or a single element may be divided into a plurality of elements to perform a function, and the integrated embodiment and divided embodiment of the respective elements are included in the scope of the invention unless it diverts from the essence of the invention.

Figure 1:
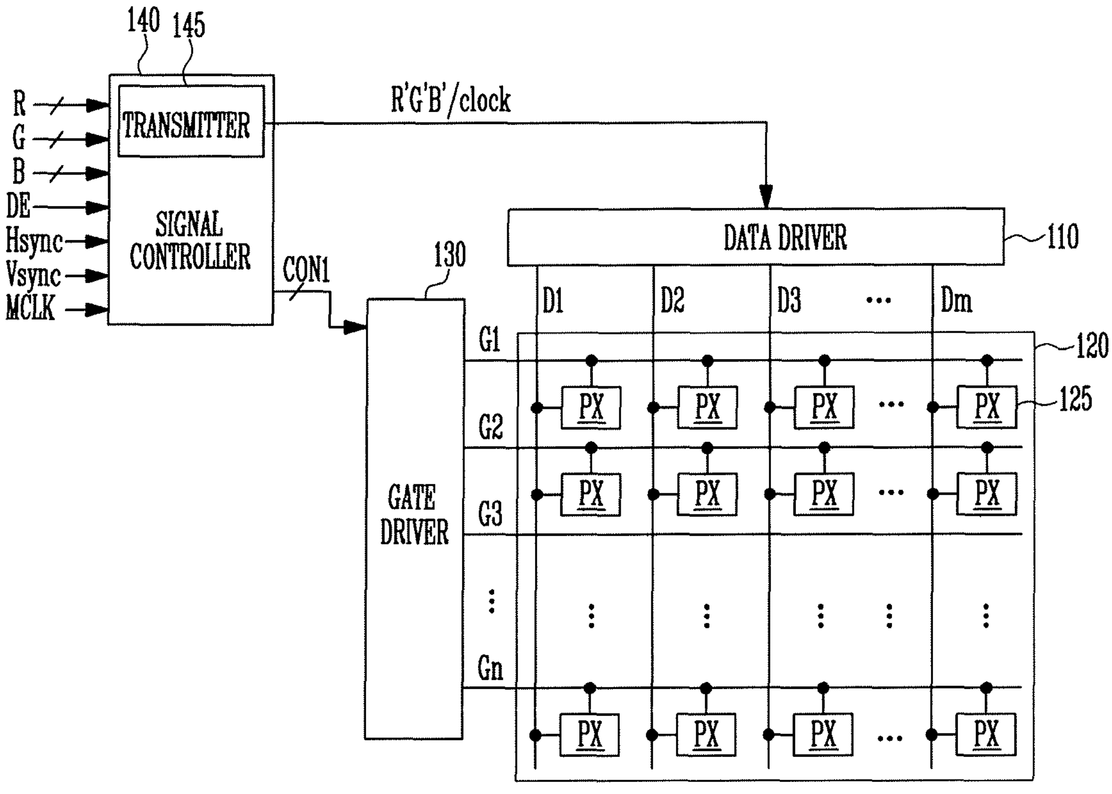
FIG. 1 is a block configuration diagram of a display device according to an embodiment of the invention.
Figure 2:
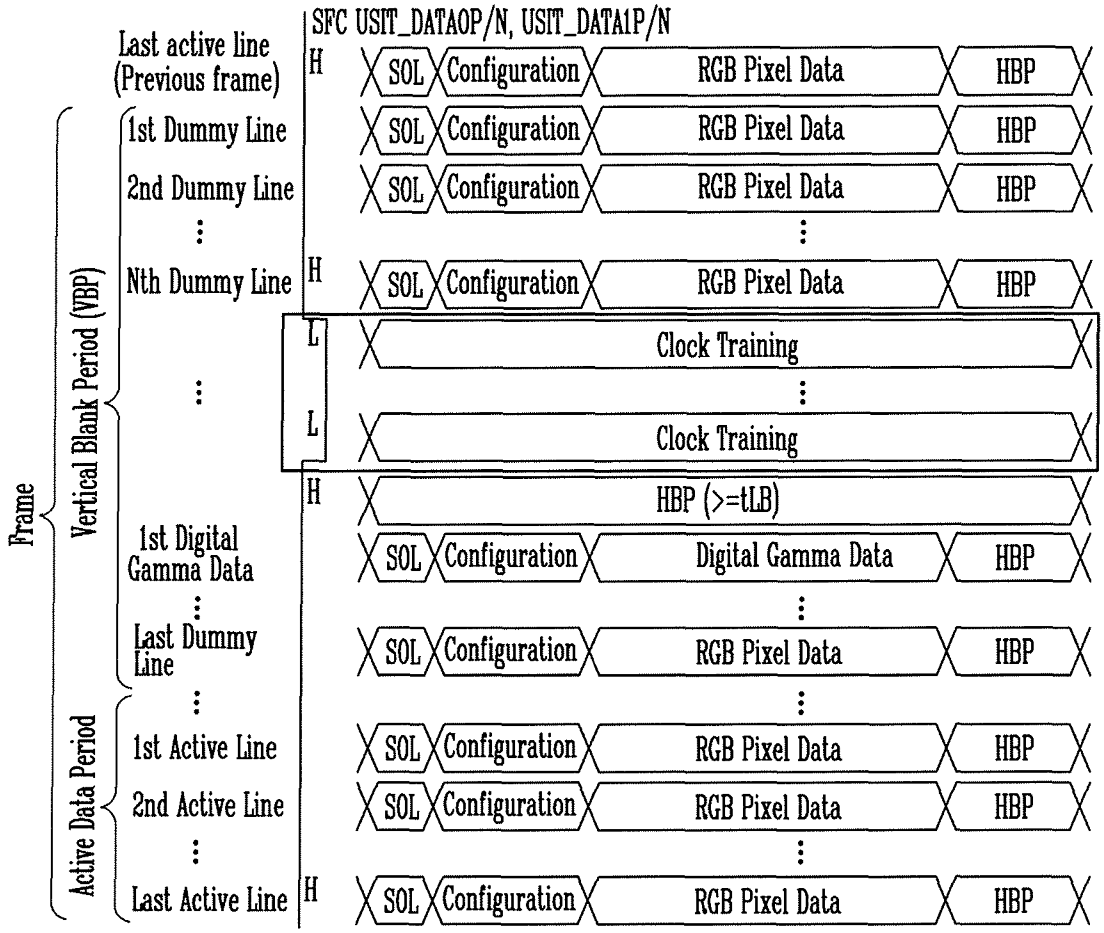
FIG. 2 is a diagram illustrating an example of the configuration of one frame.

FIG. 1 is a block configuration diagram of a display device according to an embodiment of the present invention. FIG. 2 is a diagram illustrating an example of the configuration of one frame.

Referring to FIG. 1, the display device according to the embodiment of the present invention may include a display unit 120, a data driver 110 and a gate driver 130, which drive the display unit 120, and a signal controller 140 which controls the data driver 110 and the data driver 130.

The display unit 120 is a display area including a plurality of pixels PX 125. According to an embodiment, the display unit 120 may be an organic light emitting display panel. The display unit 120 may include a plurality of gate lines G1 to Gn which transmit a plurality of gate signals (also referred to as scan signals) and a plurality of data lines D1 to Dm which transmit a plurality of data signals. The plurality of gate lines G1 to Gn may extend in a lateral direction, and the plurality of data lines D1 to Dm may extend in a longitudinal direction.

At least one gate line G1 to Gn and at least one data line D1 to Dm may be connected to one pixel PX 125. One pixel 125 may include a switching device connected to the gate line G1 to Gn and the data line D1 to Dm, and a drive transistor and a light emitting device, which are connected to the switching device. A control terminal of the switching device may be connected to the gate line G1 to Gn, an input terminal of the switching device may be connected to the data line D1 to Dm, and an output terminal of the switching device may be connected to the drive transistor. A data voltage transmitted through the switching device adjusts a current output from the drive transistor, and the light emitting device may emit light based on the corresponding current. The connection relationship between the drive transistor and the light emitting device may vary according to embodiments. According to an embodiment, the pixel 125 may include a red subpixel emitting red light, a green subpixel emitting green light, and a blue subpixel emitting blue light.

The signal controller 140 may receive image data R, G, and B and control signals thereof, e.g., a vertical synchronization signal Vsync, a horizontal synchronization signal Hsync, a main clock signal MCLK, and a data enable signal DE, which are input from the outside. The signal controller 140 may process signals received suitable for operating conditions of the display unit 120 and then generate and output image data R', G', and B', a gate control signal CON1, and a clock signal Clock. In this case, the method of applying the image data R', G', and B' and the clock signal Clock may use an advanced intra panel interface (AiPi) method. When the image data R', G', and B' are transmitted, the clock signal Clock may be transmitted while being embedded (included) in the image data R', G', and B'. According to an embodiment, the image data R', G', and B' and the clock signal Clock may be applied while being divided into multi levels. The clock signal Clock may be embedded in the image data R', G', and B' in a transmitter 145 such that the image data R', G', and B' are transmitted to the data driver 110. The signal controller 140 may include a timing controller (TCON). In this case, the TCON may process signals received suitable for operating conditions of the display unit 120 and then generate and output image data R', G', and B', a gate control signal CON1, and a clock signal Clock.

A timing controller (TCON) of the signal control IC and a receiver, e.g., an interface between the TCON and the data drive IC may use a uniform standard interface for TV (USI_T), etc. In this case, the data drive IC recovers an internal reference clock of the data drive IC through a clock data recovery (CDR) circuit or CDR unit. The CDR circuit may operate during a low period (vertical blank period) of a start frame control (SFC) signal to recover the internal reference clock of the data drive IC. For example, a transmitter of the signal control IC may transmit image data including a clock to the data drive IC. In the USI_T, the CDR circuit of the data drive IC may operate in the low period of the SFC signal to extract a clock applied while being embedded in the image data.

The data driver 110 generates an internal reference clock signal by extracting the clock signal Clock transmitted while being embedded in the image data R', G', and B'. Accordingly, the data driver 110 and the display unit 120 can operate. Hereinafter, for convenience of illustration, the data driver 100 may be expressed as a data drive IC. The data driver 110 may include a receiver, a clock data recovery (CDR) unit (or CDR circuit), a memory unit/frequency detector (FD) comparator, and a pulse counter. This will be described in detail later.

An interface between the signal controller 140 and the data driver 110 may use, for example, a USI_T, etc. In other words, an interface between the TCON and the data driver 110 may be the USI_T. In this case, the internal reference clock signal of the data driver 110 will be recovered through the CDR unit in the data driver 110. For example, the CDR unit may extract, from the signal controller 140, the clock signal Clock transmitted while being embedded in the image data R', G', and B', and recover the internal reference clock signal by using the extracted clock signal Clock. Thus, the data driver 110 and the display unit 120 can operate based on the recovered reference clock signal.

Referring to FIG. 2, when the clock signal Clock is transmitted while being embedded in the image data R', G', and B' as described above, the CDR unit of the data driver 110 may operate during a low period (e.g. an inactive period) of a frame control signal so as to recover the reference clock signal. For example, as shown in FIG. 2, when the frame control signal is a start frame control (SFC) signal, the CDR unit of the data driver 110 may operate during a low period (vertical blank period) of the SFC signal so as to recover the reference clock signal.

For example, the image data including R', G', and B' and having the clock signal Clock embedded therein is serial data. The interface between the signal controller 140 and the data driver 110, e.g., may be the USI_T or equivalent, through which the serial data is transmitted.

Accordingly to an embodiment of the present invention, the operation of the CDR unit to recover the reference clock during the low period of the SFC sign is minimized to minimize the radiation of high-frequency noise from the CDR unit.

Figure 3:
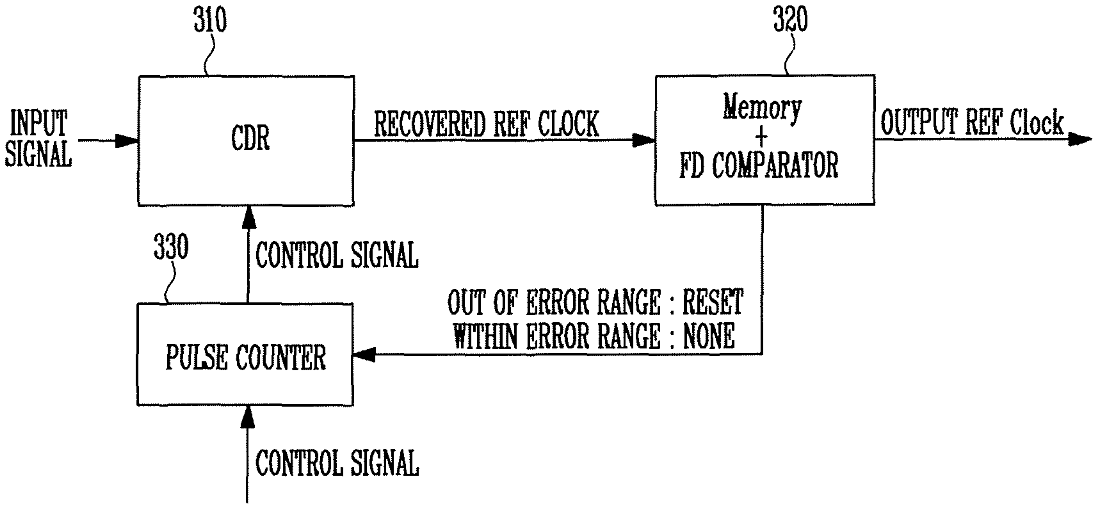
FIG. 3 is a block configuration diagram of a data driver according to an embodiment of the invention.

FIG. 3 is a block configuration diagram of a data driver according to an embodiment of the present invention.

Referring to FIG. 3, the data driver according to the embodiment of the present invention may include a reference clock generator 310, a memory unit/FD comparator 320, and a pulse counter 330. The data driver may include a receiver which receives, from the signal controller, image data R', G', and B' in which a clock signal Clock is embedded, and the like.

The reference clock generator 310 is a part that recovers a reference clock signal in the data driver. According to an embodiment, the reference clock signal generator 310 may be a CDR unit. According to an embodiment, the CDR unit 310 may include a phase locked loop (PLL) circuit.

The reference clock generator (CDR unit) 310 may receive an input signal during a low period of a frame control signal, and generate (recover) a reference clock signal REF clock by using the received input signal. For example, the CDR unit 310 may receive, from the signal controller 140, image data R', G', and B' in which a clock signal Clock is embedded. The CDR unit 310 extracts the clock signal Clock from the received image data R', G', and B'. The CDR unit 310 may generate (recover) an internal reference clock signal REF clock by using the extracted clock signal Clock, and transmit the recovered reference clock signal REF clock to the memory unit 320. For example, when the frame control signal is an SFC signal, the CDR unit 310 may recover the frequency of a reference clock signal REF clock to be stored in the memory unit 320 during a low period (vertical blank period) of the SFC signal.

A memory unit of the memory unit/FD comparator 320 may receive a reference clock signal REF clock_2 recovered from the CDR unit 310 and store the frequency of the received reference clock signal REF clock_2. A comparator (comparison unit) of the memory unit/FD comparator 320 may detect a first frequency frequency_1 of a previously stored (e.g. a preset) reference clock signal REF clock_1 and a second frequency frequency_2 of the recovered reference clock signal REF clock_2 received from the CDR unit 310. Also, the comparator (comparison unit) may compare the second frequency frequency_2 of the recovered reference clock signal REF clock_2 received from the CDR unit 310 with the first frequency frequency_1 of the previously stored reference clock signal REF clock_1. Hereinafter, for convenience of illustration, the comparator (comparison unit) may be referred to together as an FD comparator. In addition, the comparator (comparison unit) may determine whether the second frequency frequency_2 is within an error range of the first frequency frequency_1, based on a comparison result between the first frequency frequency_1 and the second frequency frequency_2.

When the second frequency frequency_2 is within the error range of the first frequency frequency_1 as the comparison result of the FD comparator 320, e.g., when the second frequency frequency_2 of the recovered reference clock signal REF clock_2 is within the error range of the first frequency frequency_1 of the previously stored frequency of the reference clock signal REF clock_1, the FD comparator 320 may not transmit any special control signal to the pulse counter 330. Alternatively, according to an embodiment, when the second frequency frequency_2 of the recovered reference clock signal REF clock_2 is within the error range of the first frequency frequency_1 of the previously stored reference clock signal REF clock_1, the FD comparator 320 may transmit, to the pulse counter 330, a control signal including information that the operation of the CDR unit 310 is to be stopped during a previously set period.

When the second frequency frequency_2 is out of the error range of the first frequency frequency_1 as the comparison result of the FD comparator 320, e.g., when the second frequency frequency_2 of the recovered reference clock signal REF clock_2 is out of the error range of the first frequency frequency_1 of the previously stored reference clock signal REF clock_1, the FD comparator 320 may transmit a reset signal RESET to the pulse counter 330. The reset signal is a signal for initializing a pulse count of the pulse counter 330. The reset signal is not limited to its term, and any term may correspond to the reset signal as long as it includes information that the pulse count of the pulse counter 330 is to be initialized.

In this case, the determination of whether the second frequency frequency_2 is within the error range of the first frequency_1 may be made based on whether the second frequency frequency_2 is within a previously set range. For example, when the first frequency frequency_1 is 100 MHz and when the error range is set to 10%, the FD comparator 320 may determine that the second frequency frequency_2 is within the error range of the first frequency frequency_1 when the second frequency frequency_2 is 95 MHz. However, when the second frequency frequency_2 is 89 MHz, the FD comparator 320 may determine that the second frequency frequency_2 is out of the error range of the first frequency frequency_1.

The FD comparator 320 may compare the first frequency frequency_1 of the previously stored reference clock signal REF clock_1 with the second frequency frequency_2 of the recovered reference clock signal REF clock_2, and then output the recovered reference clock signal REF clock_2. The FD comparator 320 may control the display unit 120 to display the received image data R', G', and b' by using the output reference clock signal REF clock_2. In this case, the memory unit 320 may store the frequency of the recovered reference clock signal REF clock_2.

In exemplary embodiment similar to the above embodiment, the CDR unit may receive an input signal during an N-th low period of a frame control signal, and generate (recover) an N-th reference clock signal REF clock by using the received input signal. N is a natural number greater than or equal to one. Each reference clock signal REF has a different frequency. The memory unit may store the frequencies for N-th reference clock signals REF clocks. The comparator (comparison unit) may compare the previously stored N-th reference clock frequencies frequency_n of a reference clock signals REF clock_n and a second frequency frequency_2 of the second recovered reference clock signals REF clock_2 received from the CDR unit.

The pulse counter 330 may internally recognize a number of low periods of the frame control signal, e.g., a number of low periods of the SFC signal and set the recognized number to a pulse count. The pulse counter 330 may determine whether the pulse count is identical to a previously set CDR unit operating condition. When the pulse count is identical to the previously set CDR unit operating condition, the pulse counter 330 may transmit an SFC signal to the CDR unit 310, operating the CDR unit 310. For example, when the number of low periods of the SFC signal is identical to the previously set CDR unit operating condition, the pulse counter 330 may allow the CDR unit 310 to operate in a corresponding low period of the SFC signal, recovering the reference clock signal REF clock.

In this case, the CDR unit operating condition refers to a condition for determining whether the CDR unit 310 is to be operated, e.g., whether the reference clock signal REF clock is to be recovered by operating the CDR unit 310 in a corresponding low period of the SFC signal. Here, the CDR unit operation condition is not limited to its term, and any term may correspond to the CDR unit operating condition as long as it is a condition capable of determining whether the CDR unit 310 is to be operated by comparing it with the number of low periods of the SFC signal. For example, the pulse counter 330 may determine whether the reference clock signal REF clock is to be recovered by operating the CDR unit 310 according to the input frame control signal. For example, the determination of whether the CDR unit 310 is to be operated may be made based on which number of the sequence of low periods of the frame control signal corresponds to.

For example, the CDR unit operating condition may be set to $2^N$ (N is 0 or a multiple of 2 (2, 4, 6, 8, . . . )). In this case, for convenience of illustration, the CDR unit operating condition is referred to as a previously set CDR unit operating value. The pulse counter 330 may determine which number of the sequence of the low periods the input frame control signal corresponds to, e.g., the SFC signal corresponds to and sets the determined number of times to a pulse count. For example, if a first SFC signal is input, the low period of the SFC signal corresponds to a first time, and hence the pulse count is set to 1. Since the pulse count value set to 1 is identical to 1 among the previously set CDR operating values, the pulse counter 330 may transmit the first SFC signal to the CDR unit 310 to be operated. If a second SFC signal is input, the low period of the SFC signal corresponds to a second time, and hence the pulse count is set to 2. Since the pulse count value set to 2 is identical to 2 among the previously set CDR unit operating values, the pulse counter 330 may transmit the second SFC signal to the CDR unit 310 to be operated. After that, if a third SFC signal is input, the low period of the SFC signal corresponds to a third time, and hence the pulse count is set to 3. Since any value among the previously set CDR unit operating values $2^N$ is not identical to the pulse count set to 3, the pulse counter 330 does not transmit the third SFC signal to the CDR unit 310. Similarly, the pulse counter 330 may transmit, to the CDR unit 310, an SFC signal corresponding to a fourth low period of the SFC signal. The pulse counter 330 does not transmit, to the CDR unit 310, SFC signals corresponding to fifth to seventh low periods of the SFC signals. The pulse counter 330 may transmit, to the CDR unit 310, an SFC signal corresponding to an eighth low period of the SFC signal. Thus, the number of times of operating the CDR unit 310 based on the CDR unit operating condition is decreased, and the EMI is reduced.

In the above-described embodiment, the previously set CDR unit operating condition (CDR unit operating value) may be set to $2^N$ (N=0 or 2n (n is an integer)), but the above-described embodiment is not limited thereto. For example, the previously set CDR unit operating value may be set to 2N (N is an integer of 0 or more). In an exemplary embodiment, the previously set CDR unit operating value may be set to 3N (N is an integer of 0 or more) or 2N+1 (N is an integer of 0 or more). The previously set CDR unit operating value may be set according to a driving environment of the display device.

When the pulse counter 330 receives a reset signal from the FD comparator 320, the pulse count may be initialized. For example, when the FD comparator 320 determines that the second frequency frequency_2 is out of the error range of the first frequency frequency_1, e.g., when the second frequency frequency_2 of the recovered reference clock signal REF clock_2 is out of the error range of the first frequency frequency_1 of the previously stored reference clock signal REF clock_1, the pulse counter 330 may receive a reset signal from the FD comparator 320. If the pulse counter 330 receives the reset signal, the pulse count value may be initialized.

For example, the pulse counter 330 receiving the fourth SFC signal may determine that the pulse count set to 4 is identical to the previously set CDR unit operating condition and transmit the fourth SFC signal to the CDR unit 310. Accordingly, the CDR unit 310 recovers a reference clock signal and transmits the recovered reference clock to the memory unit/FD comparator 320. In this case, the FD comparator 320 may compare the reference clock signal recovered by the CDR unit 310 as the fourth SFC signal is received with a previously stored frequency of the reference clock signal, determining whether the recovered reference clock is within an error range of the previously stored reference clock signal. When the recovered reference clock signal is within the error range of the previously stored reference clock signal, the FD comparator 320 does not transmit any signal to the pulse counter 330. When a new SFC signal is received, the pulse counter 330 may set the pulse count to 5, and determine whether the CDR unit 310 is to be operated by comparing the pulse count set to 5 with the CDR unit operating condition. On the other hand, when the recovered reference clock signal is not within the error range of the previously stored reference clock signal, the FD comparator 320 may transmit a reset signal, and the pulse counter 330 may initialize the pulse count. Accordingly, when the pulse counter 330 receives a new SFC signal, the pulse count is set to 1, and determines whether the CDR unit 310 is to be operated by comparing the pulse count set to 1 with the CDR unit operating condition.

The pulse counter 330 may further include a switch unit. When the pulse count based on the input SFC signal corresponds to the operating condition of the CDR unit 310, the pulse counter 330 may turn on the switch unit to transmit the SFC signal to the CDR unit 310.

The receiver may change the received image data R', G', and B' into a data voltage, and transmit the data voltage to the data line D1 to Dm.

In FIG. 3, it is illustrated that the CDR unit 310 receives one input signal. However, according to an embodiment, the CDR unit 310 may receive two signals, e.g., positive and negative signals such as signals USI_T P and USI_T N.

In FIG. 3, the CDR unit 310, the memory unit/FD comparator 320, and the pulse counter 330 are illustrated as separate components. However, the present invention is not limited thereto, and one controller or two or more controllers may control the CDR unit 310, the FD comparator 320, and the pulse counter 330 to be operated.

Figure 4:
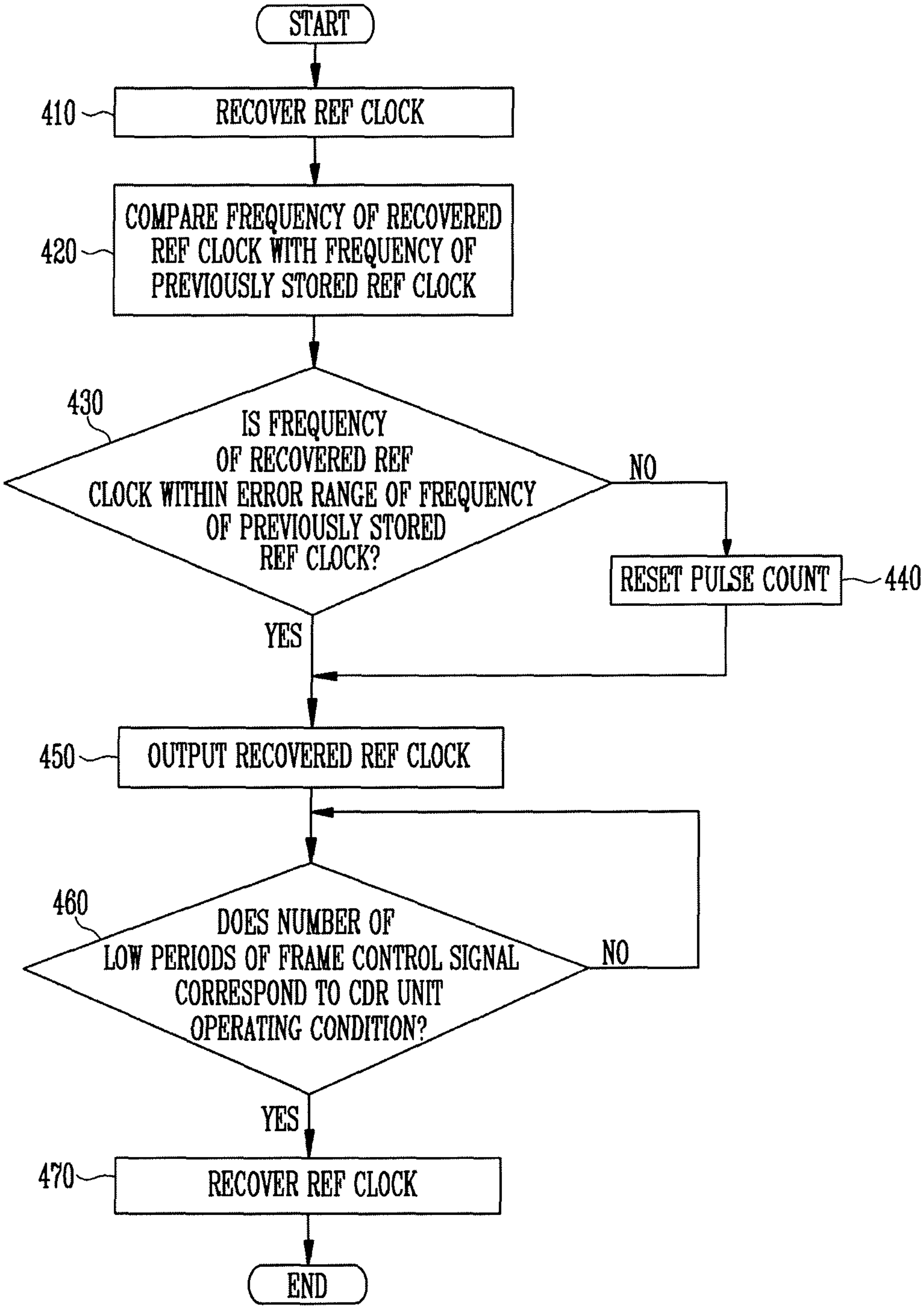
FIG. 4 is a flowchart illustrating of a data driver according to an embodiment of the invention.

FIG. 4 is a flowchart illustrating the operation of a data driver according to an embodiment of the present invention.

Referring to FIG. 4, in step 410, the data driver may recover a reference clock signal REF clock. In step 420, the data driver may compare the frequency of the recovered reference clock signal with the frequency of a reference clock signal previously stored in the memory unit. In step 430, the data driver may determine whether the frequency of the reference clock signal recovered in step 410 is within an error range of the frequency of the previously stored reference clock signal. This has been described in reference to FIG. 3, and therefore, its further description will be omitted.

When the frequency of the recovered reference clock signal is not within the error range of the frequency of the previously stored reference clock signal as the determination result in step 430, in step 440, the data driver may initialize a pulse count. In step 450, the data driver may output the reference clock signal recovered in step 410.

However, when the frequency of the recovered reference clock signal is within the error range of the frequency of the previously stored reference clock signal as the determination result in step 430, in step 450, the data driver may output the reference clock signal recovered in step 410 without initializing the pulse count.

In step 460, the data driver may determine whether the number of low periods of a newly input frame control signal corresponds to a previously set CDR unit operating condition. For example, the data driver may count a number of low periods of the frame control signal, e.g., the SFC signal, and compare the counted value with the CDR unit operating condition, e.g., the CDR unit operating value.

If the number of low periods of the input frame control signal corresponds to the previously set CDR unit operating condition, in step 470, the data driver may transmit the input frame control signal to the CDR unit to recover the reference clock signal. On the other hand, if the number of low periods of the input frame control signal does not correspond to the previously set CDR unit operating condition, the data driver does not transmit the corresponding frame control signal to the CDR unit. When a new frame control signal is received, in step 460, the data driver may determine whether the newly received frame control signal corresponds to the CDR unit operating condition.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the invention as set forth in the following claims.

What is claimed is:

1. A display device comprising:

a display unit configured to display an image using a light emitting device;

a signal controller configured to transmit an image signal and a control signal, the image signal is embedded with a clock signal;

a data driver comprising a clock data recovery (CDR) circuit that extracts from the image signal a first internal reference clock signal during an inactive period of a first frame control signal;

a memory that stores the frequency of a preset reference clock signal;

a comparator that compares the frequency of the recovered first internal reference clock signal with the frequency of the preset reference clock signal, wherein when the frequency of the recovered first internal reference clock signal is within an error range of the frequency of the preset reference clock signal, outputs the recovered first internal reference clock signal, and receives a second frame control signal, and when the second frame control signal corresponds to a previously set CDR circuit operating condition, recovers a second internal reference clock signal.

2. The display device of claim 1, wherein the data driver includes:

a CDR circuit configured to recover the first internal reference clock signal and the second internal reference clock signal; the memory configured to store the frequency of the preset reference clock signal;

the comparator configured to receive the first internal reference clock signal, compare the frequency of the preset reference clock signal with the frequency of the first internal reference clock signal, and when the frequency of the recovered first internal reference clock signal is within the error range of the frequency of the preset reference clock signal output the recovered first internal reference clock signal; and a pulse counter configured to receive the second frame control signal, determine whether the second frame control signal corresponds to the previously set CDR circuit operating condition, and when the second frame control signal corresponds to the previously set CDR circuit operating condition, transmit the second frame control signal to the CDR circuit.

3. The display device of claim 2, wherein, when the frequency of the recovered first internal reference clock signal is out of the error range of the frequency of the preset reference clock signal, the data driver initializes the pulse count, and outputs the recovered first internal reference clock signal.

4. The display device of claim 1, wherein the data driver determines which number of a sequence of the inactive period the second frame control signal corresponds to and sets a pulse count to the determined number of times, determines whether the pulse count is identical to a previously set CDR circuit operating value, and when the pulse count is identical to the previously set CDR circuit operating value, recovers the second internal reference clock signal during the inactive period of the second frame control signal.

5. The display device of claim 4, wherein the previously set CDR circuit operating value is $2^N$, where N is 0 or a multiple of 2.

6. The display device of claim 1, wherein, when the pulse count is not identical to the previously set CDR circuit operating value, the data driver omits the recovery of the second internal reference clock signal during the inactive period of the second frame control signal.

7. The display device of claim 1, wherein the first frame control signal is a start frame control (SFC) signal.

8. The display device of claim 1, wherein, when the frequency of the recovered first internal reference clock signal is within the error range of the frequency of the preset reference clock signal, the data driver generates a control signal including information that the operation of the CDR circuit is to be stopped during a predetermined period.

9. A method of driving a display device, the method comprising:

receiving a first frame control signal; recovering a first internal reference clock signal during a inactive period of the first frame control signal;

comparing the frequency of the recovered first internal reference clock signal with the frequency of a preset reference clock signal, wherein when the frequency of the recovered first internal reference clock signal is within an error range of the frequency of the preset reference clock signal, outputting the recovered first internal reference clock signal;

receiving a second frame control signal; and when the second frame control signal corresponds to a previously set CDR circuit operating condition, recovering the second internal reference clock signal.

10. The method of claim 9, wherein the recovering of the second internal reference clock signal includes:

determining which number of a sequence the inactive period of the second frame control signal corresponds to and setting a pulse count to the determined number of times; determining whether the pulse count is identical to a previously set CDR circuit operating value; and when the pulse count is identical to the previously set CDR circuit operating value, recovering the second internal reference value during the inactive period of the second frame control signal.

11. The method of claim 10, further comprising, when the pulse count is not identical to the previously set CDR circuit operating value, omitting the recovery of the second internal reference clock signal during the inactive period of the second frame control signal.

12. The method of claim 10, further comprising:

when the frequency of the recovered first internal reference clock signal is out of the error range of the frequency of the preset reference clock signal, initializing the pulse count; and outputting the recovered first internal reference clock signal.

13. The method of claim 10, wherein the first frame control signal is an SFC signal.

14. The method of claim 10, wherein the previously set CDR circuit operating value is $2^n$, where N is 0 or a multiple of 2.

15. The method of claim 9, further comprising, when the frequency of the recovered first internal reference clock signal is within the error range of the frequency of the preset reference clock signal, generating a control signal including information that the operation of the CDR circuit is to be stopped during a predetermined period.

16. A display device comprising:

a signal controller that transmits an image signal having an embedded clock signal;

a data driver includes:

a clock data recovery (CDR) circuit that recovers from the image data a first internal reference clock signal during an off period of a first frame control signal and when a second frame control signal corresponds to a previously set CDR circuit operating condition, the CDR circuit recovers a second internal reference clock signal; a memory unit stores a frequency of a preset reference clock signal; a comparator compares the frequency of the recovered first internal reference clock signal with the frequency of the preset reference clock signal, outputs the frequency of the recovered first internal reference clock signal, and receives a second frame control signal when the frequency of the recovered first internal reference clock signal is within an error range of the frequency of the preset reference clock signal.

17. The display device of claim 16, further comprising a pulse counter determines the number of inactive period of the second frame control signal within a sequence corresponds to and sets the pulse counter to the determined number of times, determines whether the pulse counter is identical to a previously set CDR circuit operating value, and when the pulse counter is identical to the previously set CDR circuit operating value, the CDR circuit recovers the second internal reference clock during the inactive period of the second frame control signal.

18. The display device of claim 17, wherein the previously set CDR circuit operating value is $2^N$, where N is 0 or a multiple of 2.

19. The display device of claim 16, wherein the memory stores the frequency of a one or more reference clock signals, the comparator compares the frequency of the recovered first internal reference clock signal with the frequencies of each preset reference clock signals.

* * * * *